United States Patent
Kubo

(10) Patent No.: US 7,542,083 B2
(45) Date of Patent: Jun. 2, 2009

(54) READ CONTROLLER FOR IMAGE PICK-UP DEVICE AND IMAGE PICK-UP APPARATUS

(75) Inventor: Naoki Kubo, Asaka (JP)

(73) Assignee: Fujifilm Corporation, Tokyo (JP)

( * ) Notice: Subject to any disclaimer, the term of this patent is extended or adjusted under 35 U.S.C. 154(b) by 505 days.

(21) Appl. No.: 11/074,708

(22) Filed: Mar. 9, 2005

(65) Prior Publication Data

US 2005/0200719 A1    Sep. 15, 2005

(30) Foreign Application Priority Data

Mar. 10, 2004  (JP) ............... 2004-066856

(51) Int. Cl.
*H04N 9/64* (2006.01)
*H04N 3/14* (2006.01)

(52) U.S. Cl. ...................... 348/248; 348/311

(58) Field of Classification Search ............... 348/241, 348/248, 294, 296–299, 303, 305, 311, 314
See application file for complete search history.

(56) References Cited

U.S. PATENT DOCUMENTS

| | | | | |
|---|---|---|---|---|
| 5,978,024 A * | 11/1999 | Lee | ............... | 348/299 |
| 6,661,451 B1 * | 12/2003 | Kijima et al. | ............ | 348/220.1 |
| 6,778,214 B1 * | 8/2004 | Toma | ............ | 348/314 |
| 6,778,215 B1 * | 8/2004 | Nakashima et al. | ......... | 348/314 |
| 7,095,440 B2 * | 8/2006 | Fossum | ............ | 348/308 |
| 7,199,351 B2 * | 4/2007 | Toma | ............ | 250/214.1 |

FOREIGN PATENT DOCUMENTS

| | | |
|---|---|---|
| JP | 9-121310 | 5/1997 |
| JP | 11-331708 | 11/1999 |
| JP | 2000-101929 | 4/2000 |
| JP | 2000101929 A * | 4/2000 |

OTHER PUBLICATIONS

Notification of Reasons for Refusal dated Mar. 17, 2008 with an English translation.

* cited by examiner

*Primary Examiner*—Timothy J Henn
(74) *Attorney, Agent, or Firm*—McGinn IP Law Group, PLLC

(57) ABSTRACT

In a digital camera that captures object light through a CCD and creates an image signal, a CPU and a bias controller set an overflow drain voltage when smear is read by a vertical drive section to an overflow drain voltage lower than an overflow drain voltage when a still picture is read. With the above arrangement, there are provided a read controller for an image pick-up device, which can read out a sufficiently large amount of saturated charges from the image pick-up device by suppressing a decrease in an amount of saturated charges even if a voltage fluctuation occurs due to smear read-out, and an image pick-up apparatus that can obtain an image of excellent quality.

20 Claims, 10 Drawing Sheets

READ CONTROLLER FOR IMAGE PICK-UP DEVICE AND IMAGE PICK-UP APPARATUS

BACKGROUND OF THE INVENTION

1. Field of the Invention

The present invention relates to a read controller for an image pick-up device that controls reading of charges accumulated in a plurality of sensors disposed in the image pick-up device through predetermined transfer paths and to an image pick-up apparatus that captures object light by the image pick-up device and creates an image signal.

2. Description of the Related Art

A digital camera as one of image pick-up apparatuses widely employs a charge coupled device (hereinafter, abbreviated as CCD) as an image pick-up device. The CCD is the image pick-up device having photoelectric transducers such as photo diodes and the like as a plurality of sensors disposed on a semiconductor substrate, wherein the photoelectric transducers accumulate charges according to an amount of light, and the accumulated charges are read out through predetermined transfer paths.

A substrate bias voltage is applied to the semiconductor substrate constituting the CCD from a bias controller disposed inside or outside the CCD, and the photoelectric transducers have a potential profile for accumulating charges according to the magnitude of the substrate bias voltage applied thereto. Further, the CCD often includes an over drain structure to which an overflow drain voltage (hereinafter, abbreviated as OFD voltage) is applied to discharge the saturated charges accumulated in the photoelectric transducers to the semiconductor substrate. The CCD arranged as described above is controlled such that excessive charges do not overflow to the transfer paths even if pixels mixedly exist in the CCD when a moving picture is recorded by, for example, decreasing the OFD voltage when a still picture is recorded to thereby accumulate a large amount charges in the photoelectric transducers and by increasing the OFD voltage when the moving picture is recorded to thereby accumulate a small amount of charges therein. Further, there are proposed in the CCD a technique for adjusting the OFD voltage by a load means connected to a control terminal (refer to, for example, Japanese Patent Application Laid-Open No. 9-121310) and a technique for making the amount of saturated charges accumulated in the photoelectric transducers uniform by setting a potential barrier in a high state by applying a predetermined OFD voltage (refer to, for example, Japanese Patent Application Laid-Open No. 11-331708).

There are known digital cameras provided with a mechanical shutter as well as a read controller for an image pick-up device that controls reading of charges from a CCD having the over drain structure. When a still picture is picked up with the digital camera, first, exposure is executed. In the exposure, there are executed processing for displaying an object observing through image on an image monitor in the state that the mechanical shutter is opened, and the like. Next, smear is read out to clear transfer paths by reading out the charges remaining in the transfer paths in the state that no light is incident by closing the mechanical shutter. The smear is read out in response to relatively high speed pulses. In general, when the still picture is picked up, the OFD voltage is set to a relatively low level so that charges are sufficiently accumulated in the photoelectric transducers. Accordingly, spike-like noise occurs in the OFD voltage set to the low level because the OFD voltage is affected by the high speed pulses in the smear read-out process. The noise is mixed with the substrate bias voltage that determines the magnitude of the potential profile of the photoelectric transducers. As a result, a problem arises in that the charges accumulated in the photoelectric transducers are discharged to a semiconductor substrate, and the amount of saturated charges of the photoelectric transducers decrease. In particular, when a power supply having a small current capacity is used, this problem arises outstandingly. Accordingly, it is difficult to obtain an image of excellent quality by the digital camera as an image pick-up apparatus.

SUMMARY OF THE INVENTION

The present invention has been made in view of the above circumstances and provides a read controller for an image pick-up device from which a sufficiently large amount of saturated charges can be read out by suppressing a decrease in the amount of saturated charges even if a voltage fluctuation occurs due to smear read and provides an image pick-up apparatus that can obtain an image of excellent quality.

In a read controller for an image pick-up device of the present invention, wherein the image pick-up device has a plurality of sensors that are disposed therein and accumulate charges according to an amount of light, the accumulated charges are read out from the image pick-up device through predetermined transfer paths, and the read controller controls reading of the charges from the image pick-up device, the read controller includes: an overflow drain voltage set section that changeably sets an overflow drain voltage for discharging the saturated charges of the sensors; and a smear read-out controlling section that clears the transfer paths by reading out the charges remaining in the transfer paths, and wherein the overflow drain voltage set section sets the overflow drain voltage to a voltage by which an amount of saturated charges equal to or larger than a predetermined amount of charges is secured even if a voltage fluctuation occurs due to smear read-out executed by the smear read-out controlling section.

The read controller for the image pick-up device of the present invention is arranged such that when smear is read out to read out the charges remaining in the transfer paths for transferring the charges accumulated in the plurality of sensors, the overflow drain voltage is set to a voltage by which the amount of saturated charges equal to or larger than the predetermined amount of charges is secured even if the voltage fluctuation occurs due to the smear read. Accordingly, it can be prevented that the charges accumulated in the plurality of sensors are discharged to a semiconductor substrate and an amount of saturated charges equal to or larger than the predetermined amount of charges is reduced. As a result, a sufficient amount of saturated charges can be read out from the image pick-up device.

In an image pick-up apparatus of the present invention that captures object light through an image pick-up device and creates an image signal, the image pick-up apparatus includes: the image pick-up device that has a plurality of sensors disposed therein and accumulate charges according to an amount of light, the accumulated charges being read out through predetermined transfer paths; an overflow drain voltage set section that changeably sets an overflow drain voltage for discharging the saturated charges of the sensors; and a smear read-out controlling section that clears the transfer paths by reading out the charges remaining in the transfer paths, and wherein the overflow drain voltage set section sets the overflow drain voltage to a voltage by which an amount of saturated charges equal to or larger than a predetermined amount of charges is secured even if a voltage fluctuation occurs due to smear read executed by the smear read-out controlling section.

The image pick-up apparatus of the present invention is arranged such that when smear is read out to read out the charges remaining in the transfer paths for transferring the charges accumulated in the plurality of disposed sensors, the overflow drain voltage is set to the voltage by which the amount of saturated charges equal to or larger than the predetermined amount of charges is secured even if the voltage fluctuation occurs due to the smear read. Accordingly, it can be prevented that the charges accumulated in the plurality of sensors are discharged to a semiconductor substrate and an amount of saturated charges equal to or larger than the predetermined amount of charges is reduced. As a result, a sufficient amount of saturated charges can be read out from the image pick-up device, thereby an image of excellent quality can be obtained.

It is preferable here that the image pick-up apparatus have a still picture pick-up mode for picking up a still picture using the image pick-up device and that the overflow drain voltage set section set an overflow drain voltage when smear is read by the smear read-out controlling section to an overflow drain voltage lower than an overflow drain voltage when the still picture is read out.

With the above arrangement, in a still picture pick-up mode in which a larger amount of charges must be accumulated, an amount of saturated charges equal to or larger than the predetermined amount of charges is secured even if a voltage fluctuation occurs due to smear read. Accordingly, an image of excellent quality can be obtained when a still picture is picked up.

According to the read controller for the image pick-up device of the present invention, a decrease in the amount of saturated charges is suppressed even if the voltage fluctuation occurs due to the smear read, thereby a large amount of saturated charges can be obtained from the image pick-up device. According to the image pick-up apparatus of the present invention, the sufficiently large amount of saturated charges can be read out from the image pick-up device by suppressing the decrease in the amount of saturated charges even if the voltage fluctuation occurs due to the smear read, thereby the image of excellent quality can be obtained.

DETAILED DESCRIPTION OF THE INVENTION

An embodiment of the present invention will be explained below with reference to the drawings.

Figure 1:
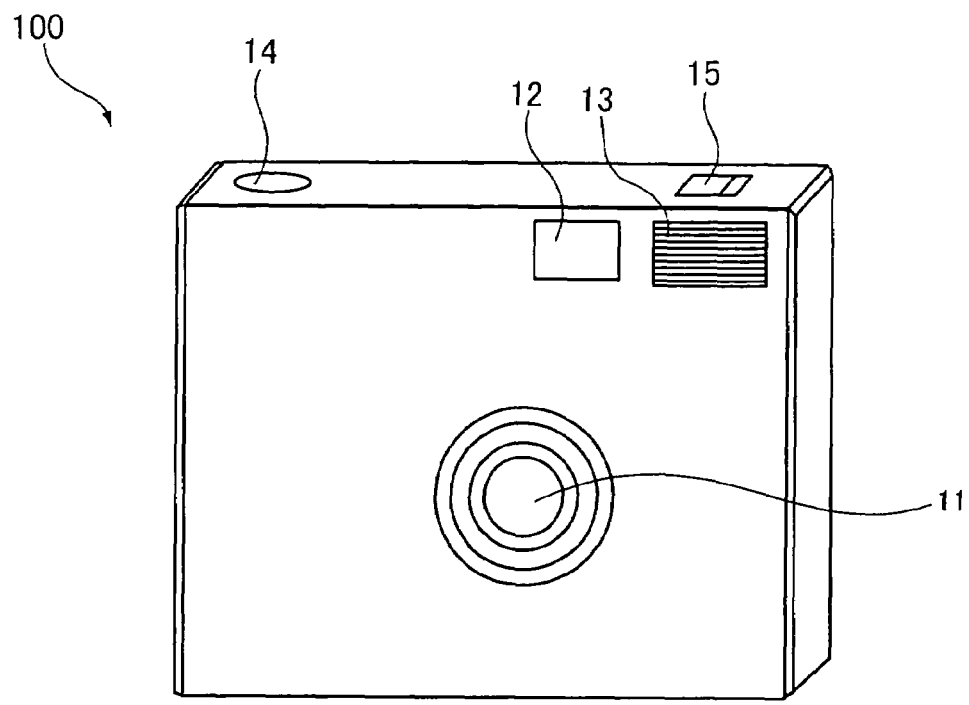
FIG. 1 is a perspective view of an outside appearance of a digital camera as an embodiment of the present invention when it is viewed from the obliquely upper front thereof.
Figure 2:
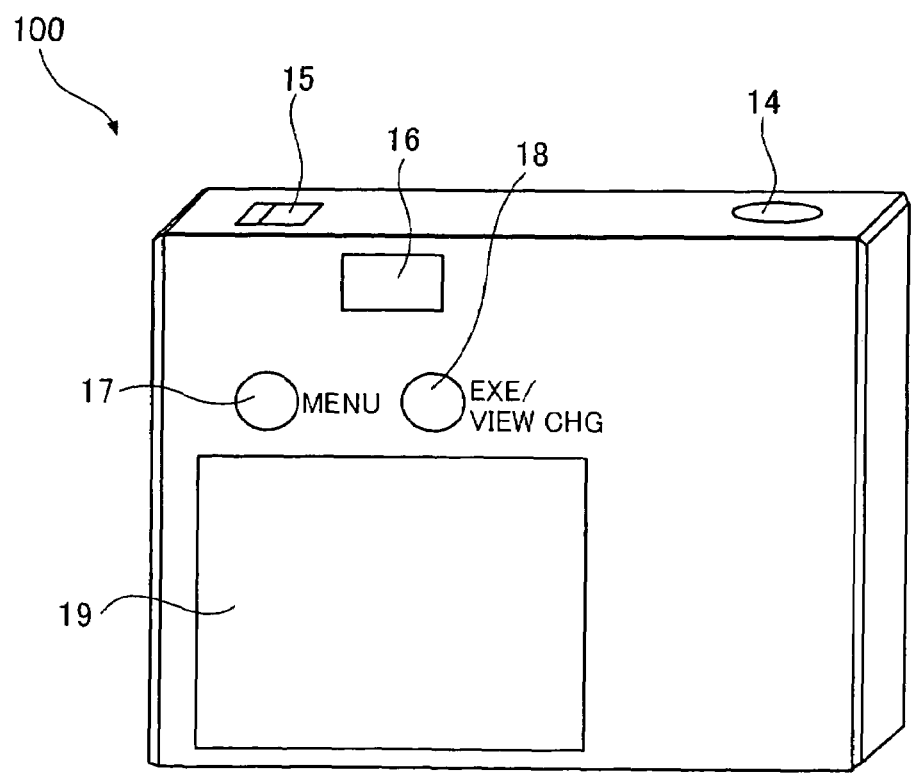
FIG. 2 is a perspective view of an outside appearance of the digital camera shown in FIG. 1 when it is viewed from the obliquely upper back thereof.

FIG. 1 is a perspective view of an outside appearance of a digital camera as an embodiment of the present invention when it is viewed from the obliquely upper front thereof, and FIG. 2 is a perspective view of an outside appearance of the digital camera shown in FIG. 1 when it is viewed from the obliquely upper back thereof. Note that an embodiment of a read controller for an image pick-up device of the present invention is assembled in the digital camera of the embodiment.

As shown in FIG. 1, an image pick-up lens 11 is disposed on a front surface of the digital camera 100 at the center thereof. Further, an optical finder objective window 12 and an auxiliary light emitter 13 are disposed on the front surface of the digital camera 100 in upper portions thereof. A shutter button 14 and a sliding power supply switch 15 are disposed on an upper surface of the digital camera 100.

As shown in FIG. 2, an optical finder ocular window 16, a menu switch 17, and an execution/screen changeover switch 18, and an image monitor 19 are disposed on a back surface of the digital camera 100.

Figure 3:
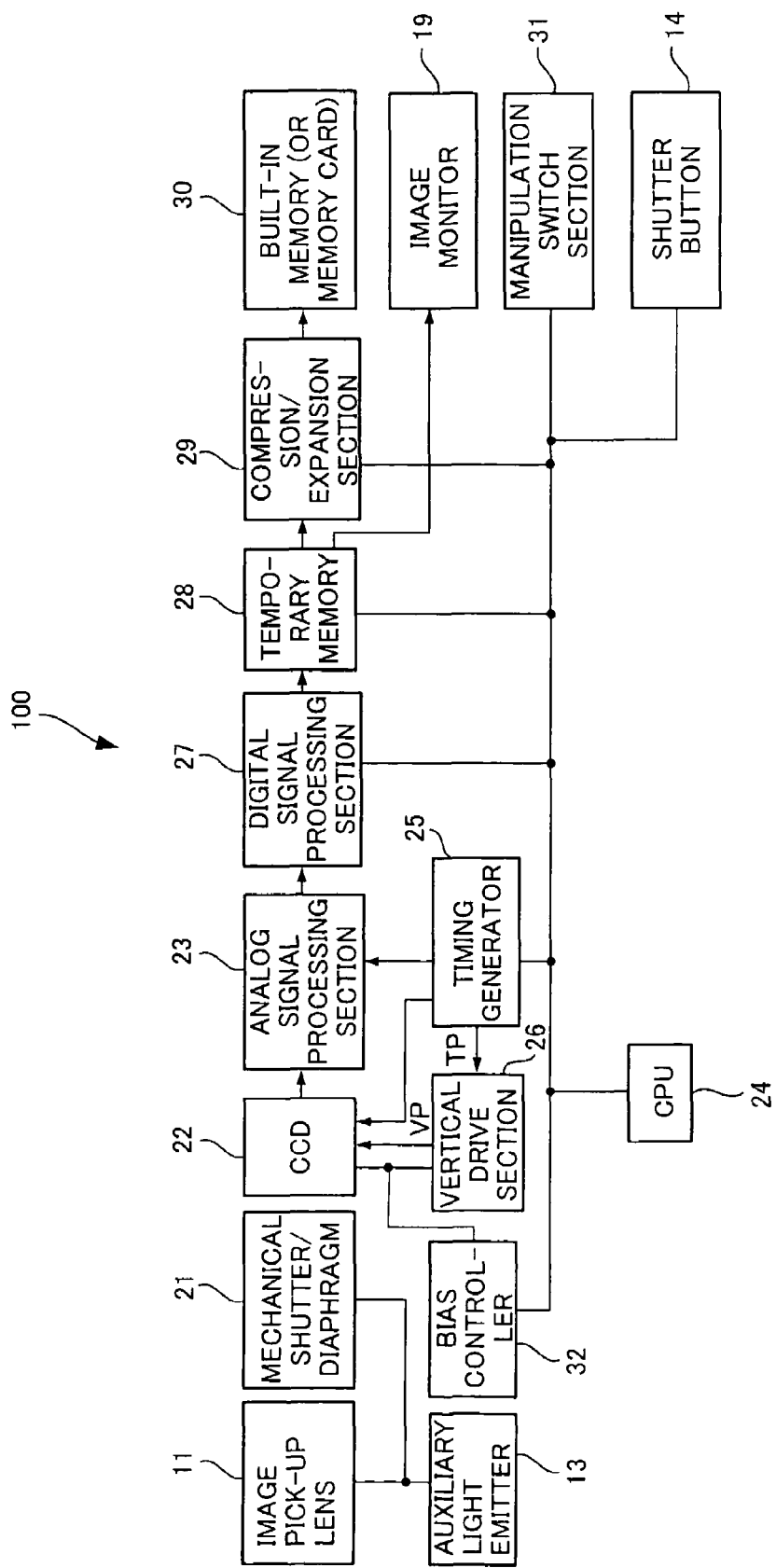
FIG. 3 is a block diagram showing a circuit arrangement of the digital camera shown in FIG. 1.

FIG. 3 is a block diagram showing a circuit arrangement of the digital camera 100 shown in FIG. 1.

The digital camera 100 is provided with the image pick-up lens 11 and the auxiliary light emitter 13 described above. Further, the digital camera 100 is provided with a mechanical shutter/diaphragm 21, a CCD 22 (corresponding to an example of an image pick-up device referred to in the present invention), an analog signal processing section 23, a CPU 24 that integrally controls the operation of the digital camera 100, a timing generator 25, a vertical drive section 26, and a bias controller 32. The CPU 24 and the bias controller 32 act as an overflow drain voltage set section of the present invention. The vertical drive section 26 acts as a smear read-out controlling section of the present invention. Further, an example of the read controller for the image pick-up device of the present invention is composed of the CPU 24, the bias controller 32, and the vertical drive section 26.

The CCD 22 includes a plurality of photoelectric transducers disposed therein (corresponding to an example of sensors according to the present invention). The photoelectric transducers accumulate charges according to an amount of light. The CCD 22 has transfer paths through which the charges accumulated in the photoelectric transducers are transferred.

The CPU 24 and the bias controller 32, which act as the overflow drain voltage set section constituting the read controller for the image pick-up device changeably set an overflow drain voltage for discharging the saturated charges of the photoelectric transducers. Further, the vertical drive section 26, which acts as the smear read-out controlling section constituting the read controller for the image pick-up device, executes smear read-out to clear the transfer paths by reading the charges remaining in the transfer paths.

More specifically, the CPU 24 and the bias controller 32 set the overflow drain voltage to a voltage by which an amount of saturated charges equal to or larger than a predetermined amount of charges are secured even if a voltage fluctuation occurs due to the smear read-out executed by the vertical drive section 26. Note that the operations of the CPU 24, bias controller 32, and the vertical drive section 26 will be described later in detail.

Object light, which passes through the image pick-up lens 11 and the mechanical shutter/diaphragm 21, is incident on the CCD 22. The CCD 22 converts the incident object light into an analog image signal as an electric signal in synchronism with the signals from the timing generator 25 and the vertical drive section 26 and outputs the analog image signal.

The analog image signal output from the CCD 22 is subjected to analog signal processing by the analog signal processing section 23. In more detail, the analog signal processing section 23 subjects the analog image signal output from the CCD 22 to analog signal processing in which the analog image signal is subjected to noise reduction processing, and the like, the thus processed analog image signal is subjected to A/D (analog/digital) conversion processing, and a resultant digital image signal is output.

Further, the digital camera 100 includes a digital signal processing section 27, a temporary memory 28, a compression/expansion section 29, a built-in memory (or card memory) 30, and the image monitor 19 described above. The digital image signal, which has been subjected to the analog signal processing by the analog signal processing section 23, is input to the digital signal processing section 27. The digital signal processing section 27 subjects the digital image signal input thereto to predetermined digital signal processing, completes image data expressing the image of an object of a scene picked up this time, and temporarily stores the image data in the temporary memory 28. The data stored in the temporary memory 28 is compressed by the compression/expansion section 29 and recorded in the built-in memory (or memory card) 30. Note that the data may be directly recorded in the built-in memory 30 omitting the step of compression depending on an image pick-up mode. The data stored in the temporary memory 28 is read out by the image monitor 19, and the image of an object is displayed thereon.

The digital camera 100 includes a manipulation switch section 31 composed of the menu switch 17 and the execution/screen changeover switch 18 described above and the shutter button 14. When an image is picked up, a desired image pick-up state is set by manipulating the manipulation switch section 31, and the shutter button 14 is depressed.

The digital camera 100 includes a still picture pick-up mode for picking up a still picture and a moving picture pick-up mode for picking up a moving picture using the CCD 22. Switching between the still picture pick-up mode and the moving picture pick-up mode is executed by manipulating the execution/screen changeover switch 18.

Figure 4:
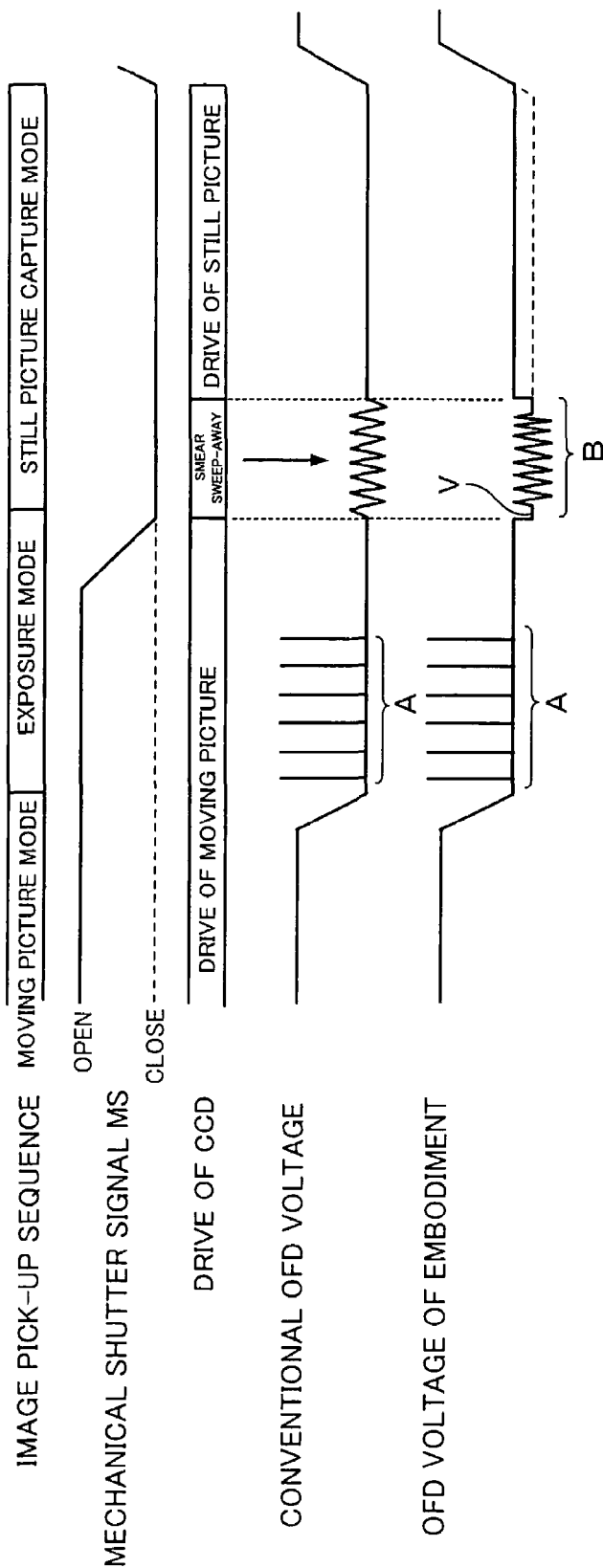
FIG. 4 illustrates a timing chart in an image pick-up sequence of the digital camera shown in FIG. 3 and a waveform of a conventional OFD voltage.

FIG. 4 illustrates a timing chart in an image pick-up sequence of the digital camera shown in FIG. 3 and a waveform of a conventional OFD voltage.

FIG. 4 shows a moving picture mode, an exposure mode, and a still picture capture mode as the image pick-up sequence. FIG. 4 also shows a mechanical shutter signal MS showing the open/close state of a mechanical shutter constituting the mechanical shutter/diaphragm 21. FIG. 4 also shows a moving picture drive state, a smear sweep-away (smear read-out) state, and a still picture drive state that show the respective drive states of the CCD 22. FIG. 4 also shows the waveform of the conventional OFD voltage and a waveform of an OFD voltage of the present invention.

In the digital camera 100, first, the image pick-up sequence is set to the moving picture mode. In the moving picture mode, an object observing through image is displayed on the image monitor 19 in the state that the mechanical shutter is opened (the mechanical shutter signal MS is set to a "H" level showing the open state of the shutter). At the time, the shutter button 14 is depressed to pick up an image. Thus, the image pick-up sequence shifts from the moving picture mode to the exposure mode. Further, the OFD voltage changes from "H" level to an "L" level (this is the same also in the conventional OFD voltage). Note that the waveforms of the OFD voltages also show an waveform of an electronic shutter signal composed of a plurality of pulses to discard the charges accumulated in the photoelectric transducers in a period A.

Next, the mechanical shutter is closed, and the mechanical shutter signal MS changes from the "H" level to the "L" level. Thus, the image pick-up sequence shifts from exposure mode to the still picture capture mode. Further, the smear sweep-away (smear read-out) is also executed. The smear read-out is executed in response to high speed pulses. Accordingly, spike-like noise occurs in the OFD voltage set to the "L" level due to the high speed pulses in any of the conventional example and this embodiment. The noise is mixed with a substrate bias voltage that determines the magnitude of the potential profile of the photoelectric transducers.

Heretofore, the OFD voltage remains at the "L" level which is set to it at the time of shift to the exposure mode. Accordingly, the charges accumulated in the photoelectric transducers are liable to be discharged to the semiconductor substrate by the noise mixed with the substrate bias voltage, from which a problem arises in that the amount of saturated charges of the photoelectric transducers is reduced.

In the embodiment, in the period B during which the smear read-out is executed, the OFD voltage is set to an OFD voltage V lower than the OFD voltage in the still picture capture mode. With this arrangement, even if the voltage fluctuation occurs due to the smear read-out in the still picture pick-up mode, the amount of saturated charges equal to or more than the predetermined amount of charges is secured, thereby a sufficiently large amount of charges can be read out from the CCD 22. As a result, an image of excellent quality can be obtained when a still picture is picked up. Note that, as shown by a dotted line, the OFD voltage of the embodiment may be kept to the low voltage V set in the period B even in a still picture drive state after the period B passes.

Figure 5:
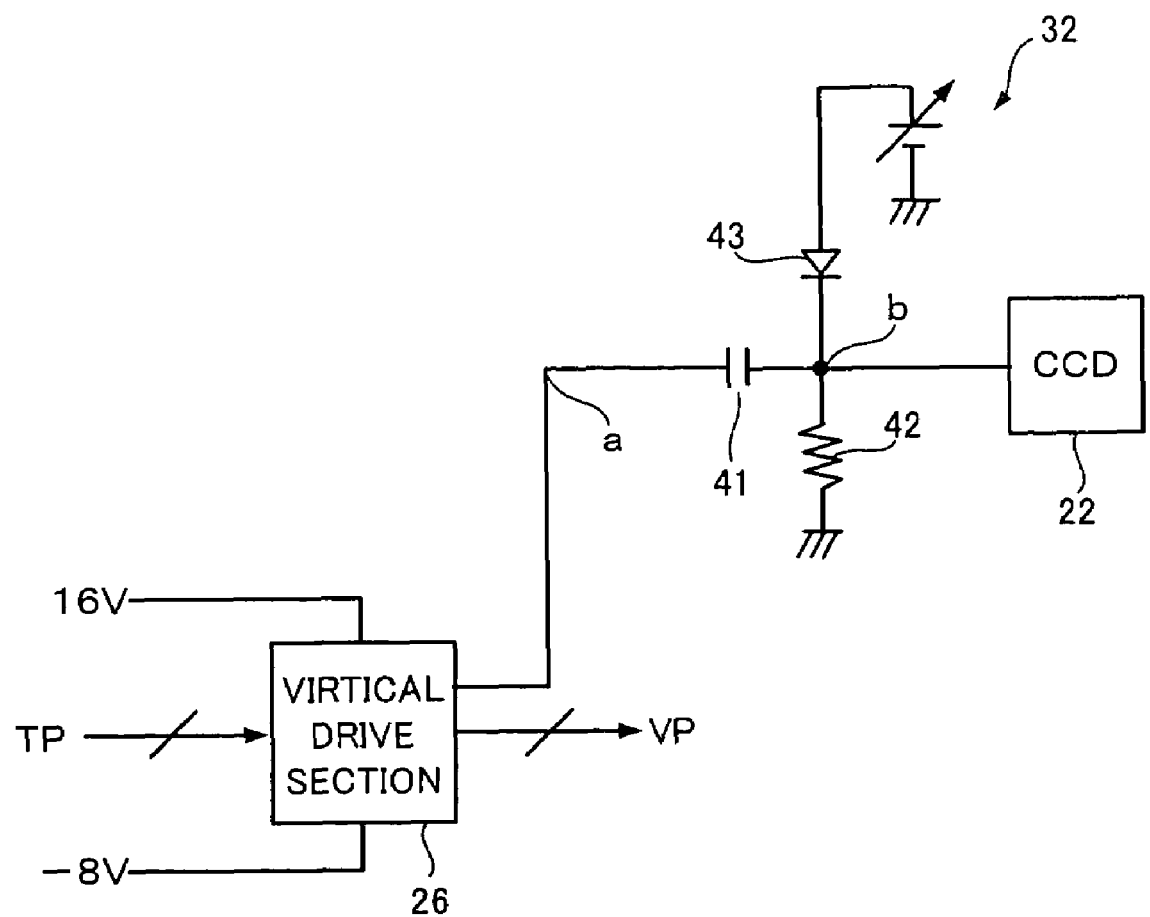
FIG. 5 illustrates a circuit for setting a low OFD voltage in a period B shown in FIG. 4.
Figure 6:
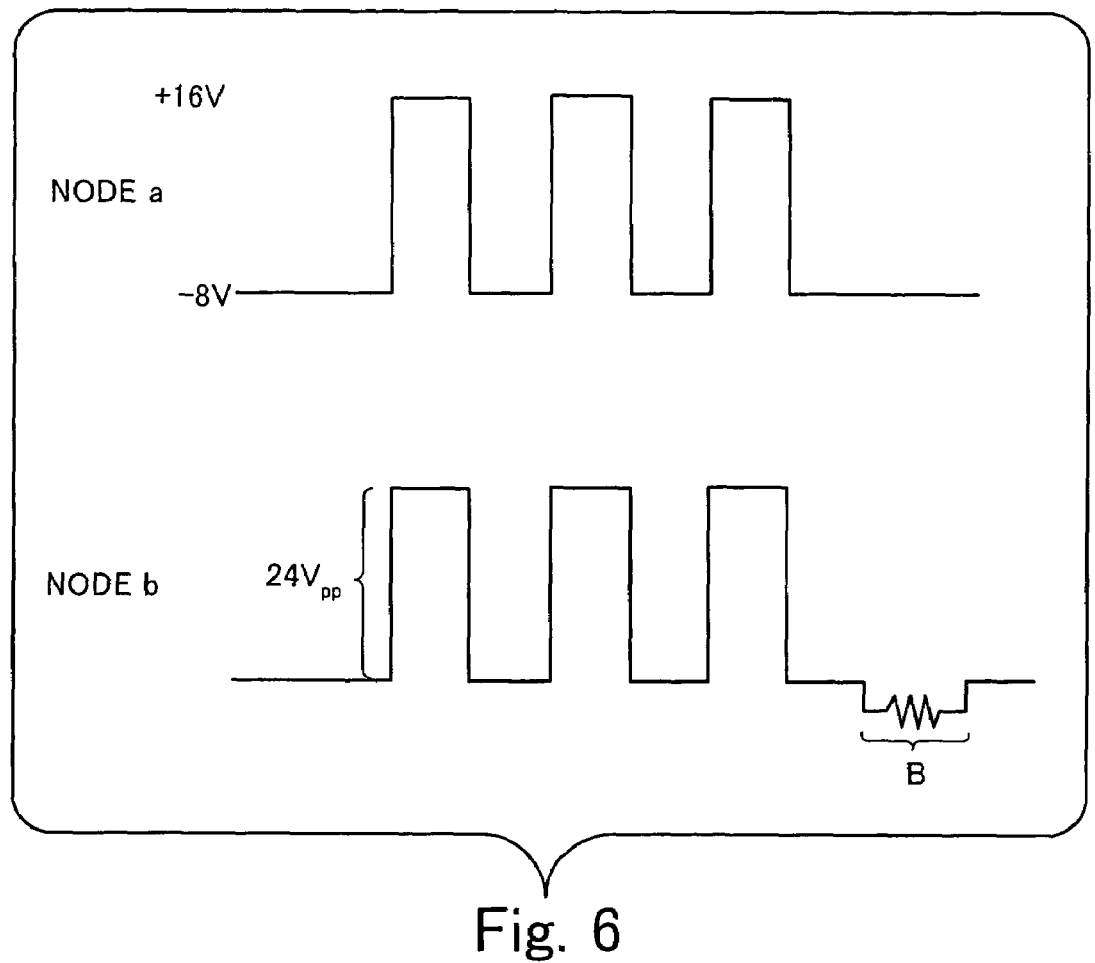
FIG. 6 illustrates signal waveforms in nodes shown in FIG. 5.

FIG. 5 illustrates a circuit for setting the low OFD voltage in the period B shown in FIG. 4, and FIG. 6 illustrates signal waveforms in nodes a and b shown in FIG. 5.

Voltages +16V and −8V are applied to the vertical drive section 26 as power supply voltages from not shown high and low voltage power supplies. Further, a timing pulse TP is input to the vertical drive section 26 from the timing generator 25. The vertical drive section 26 outputs a vertical synchronization pulse VP to the CCD 22 in response to the timing pulse TP. Further, the vertical drive section 26 outputs a pulse-shaped signal waveform, which changes in the voltage range from 16V to −8V shown in FIG. 6, from the node a. The signal waveform is applied through a capacitor 41 to the CCD 22 the input of which is grounded through a resistor 42. Further, the substrate bias voltage is applied to the CCD 22 from the bias controller 32, which is disposed externally of the CCD 22, through a diode 43. A pulse-shaped signal waveform of 24 Vpp, which is obtained by superimposing the substrate bias voltage on the above pulse-shaped signal waveform as shown in FIG. 6, is output to the node b. The smear read-out is executed in the period B of the pulse-shaped signal waveform of 24 Vpp. Accordingly, the spike-like noise occurs. The substrate bias voltage from the bias controller 32 is controlled to a low voltage by the CPU 24 in the period B.

Accordingly, in the smear read-out period B, the OFD voltage is set to the OFD voltage V lower than the OFD voltage in the still picture capture mode.

Figure 7:
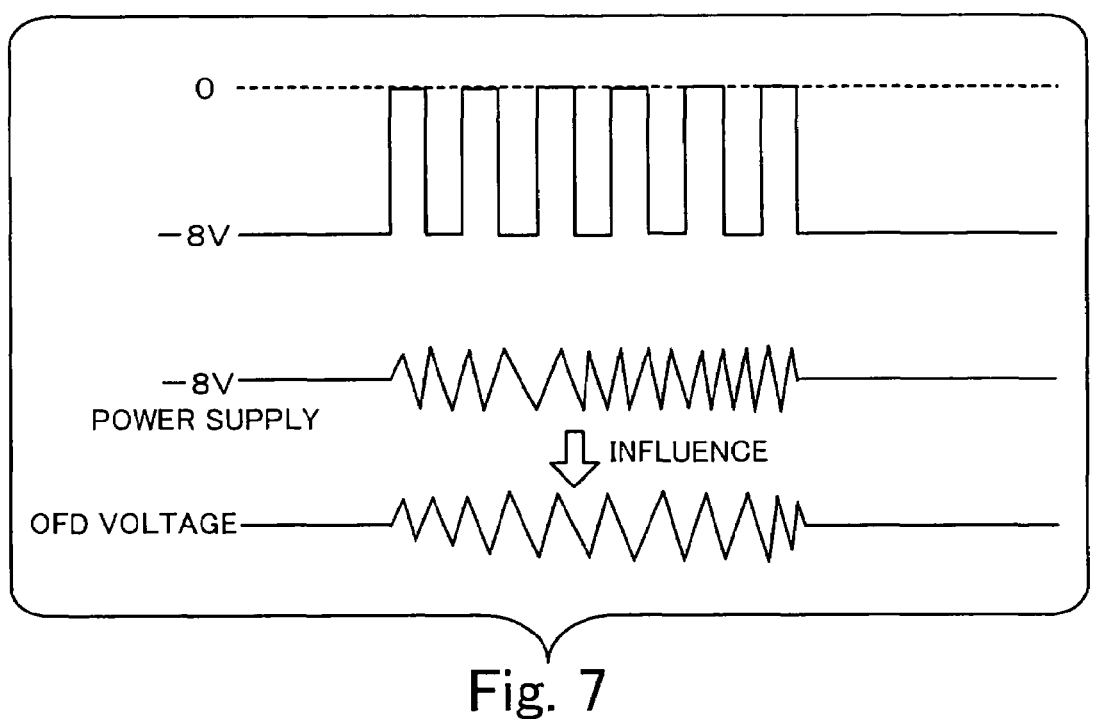
FIG. 7 illustrates how spike-like noise occurs in an OFD voltage.

FIG. 7 illustrates how the spider-like noise occurs in the OFD voltage.

When the smear is read out, the signal waveform shown in FIG. 7 is mixed with the voltage of −8V applied to the vertical drive section 26 because the vertical drive section 26 controls the smear read-out in response to the high speed pulse. Thus, the low voltage power supply for −8V fluctuates by itself, and the spike-like noise finally occurs to the OFD voltage by the influence of the fluctuation.

Figure 8:
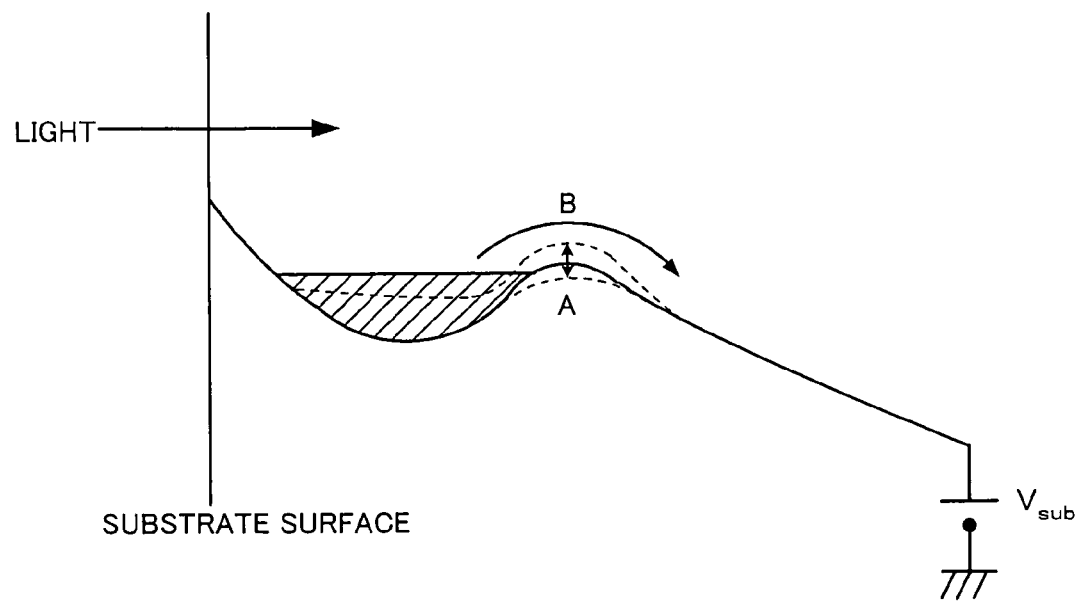
FIG. 8 shows how the charges accumulated in photoelectric transducers leak due to the noise mixed with a substrate bias voltage.

FIG. 8 shows how the charges accumulated in the photoelectric transducers leaks due to the noise mixed with the substrate bias voltage.

The photoelectric transducers formed on the semiconductor substrate constituting the CCD have the potential profile according to the magnitude of the substrate bias voltage Vsub to be applied thereto. When light is incident on the photoelectric transducers, an amount of charges, which is appropriate to the potential profile of the photoelectric transducers, is accumulated in the photoelectric transducers. When the noise is mixed with the substrate bias voltage Vsub, the potential profile fluctuates in the direction of an arrow A, thereby there is a possibility that the charges accumulated in the photoelectric transducers leak in the direction of an arrow B.

Figure 9:
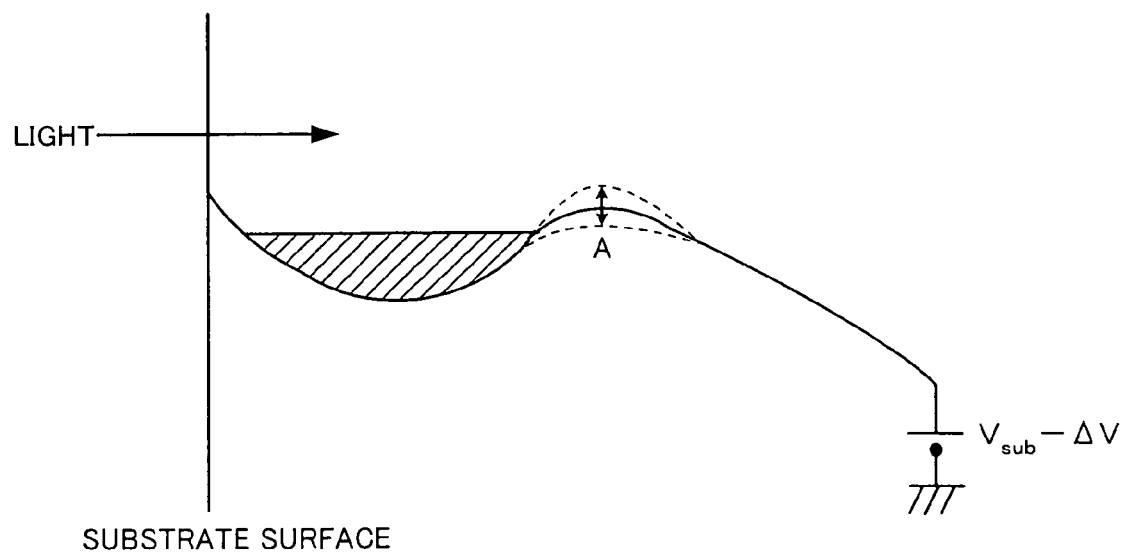
FIG. 9 illustrates how the leakage of the charges, which are accumulated in the photoelectric transducers, can be prevented by setting the substrate bias voltage to a low voltage.

FIG. 9 illustrates how the leakage of the charges, which are accumulated in the photoelectric transducers, can be prevented by setting the substrate bias voltage to a low voltage.

When the substrate bias voltage Vsub is set to a ΔV lower voltage, the potential barrier is set in a high state. Accordingly, even if the potential profile fluctuates in the direction of the arrow A when the smear is read out, the leakage of the charges accumulated in the photoelectric transducers can be prevented.

Figure 10:
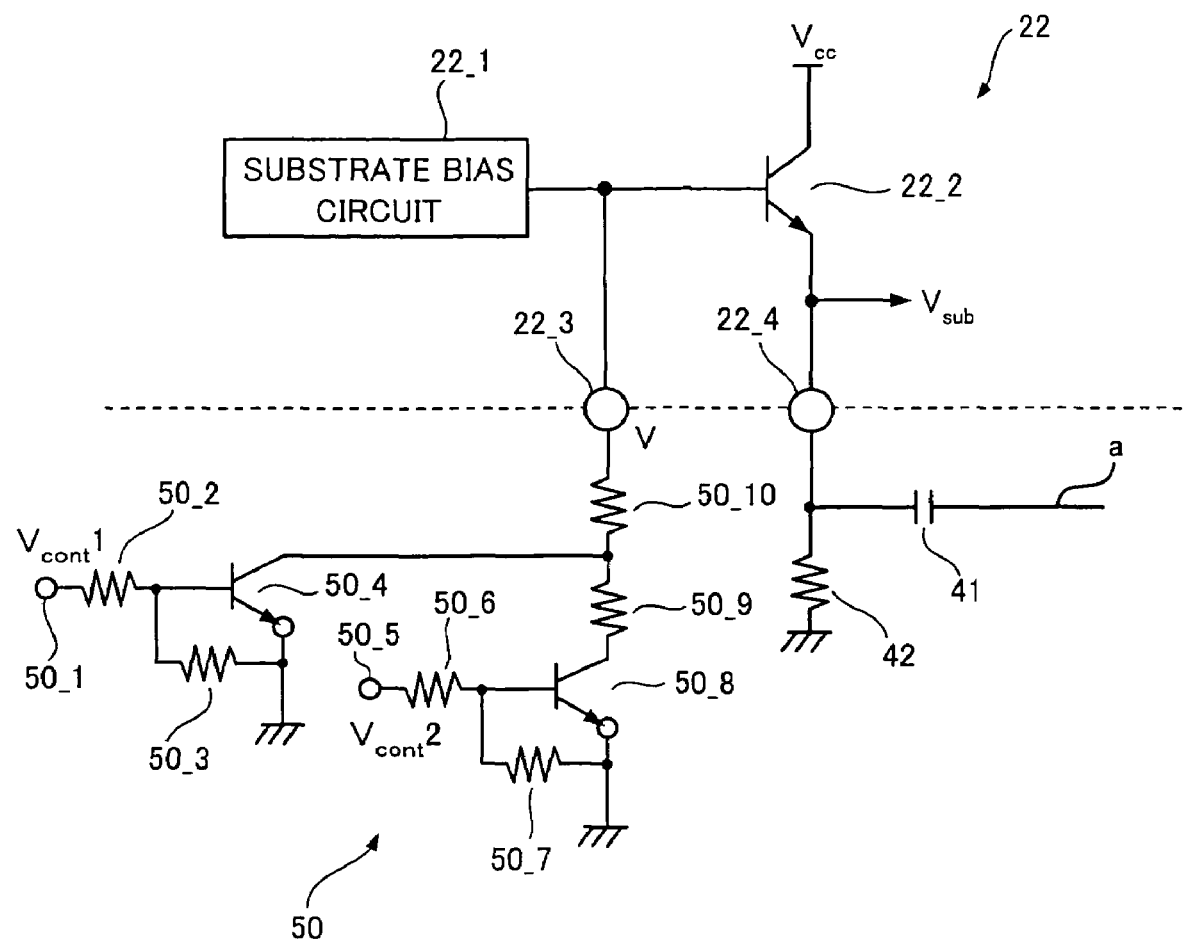
FIG. 10 illustrates an arrangement of a bias controller different from that of the bias controller shown in FIG. 5.
Figure 11:
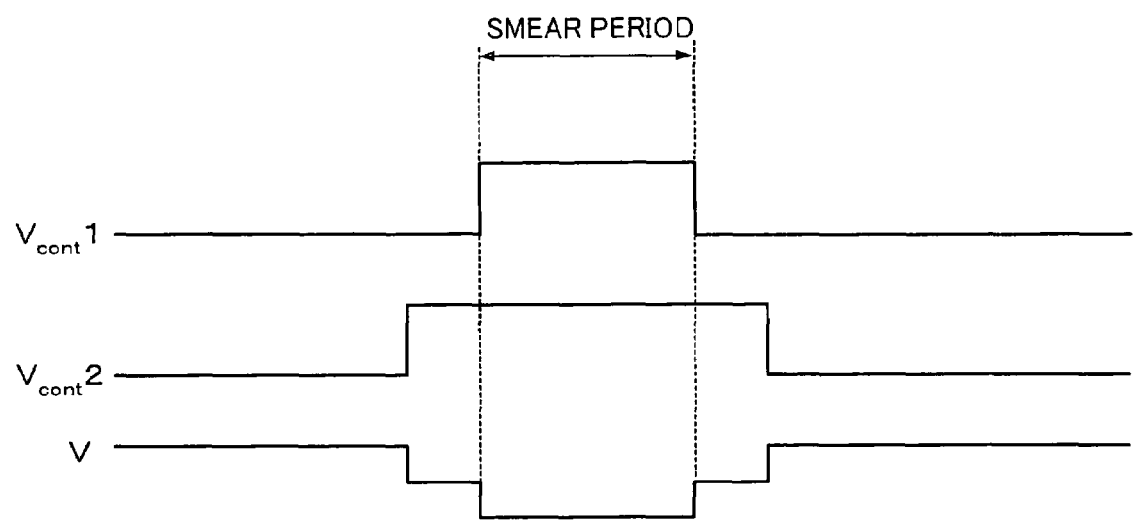
FIG. 11 is a signal waveform in the bias controller shown in FIG. 10.

FIG. 10 illustrates an arrangement of a bias controller different from that of the bias controller shown in FIG. 5, and FIG. 11 illustrates a signal waveform in the bias controller shown in FIG. 10.

The bias controller 50 shown in FIG. 10 includes a terminal 50_1, resistors 50_2 and 50_3, and a transistor 50_4. A signal Vcont1 is input from the CPU 24 to the terminal 50_1, the resistors 50_2 and 50_3 are connected in series between the terminal 50_1 and the ground, and the transistor 50_4 has a base connected to the node between the resistors 50_2 and 50_3 and an emitter connected to the ground.

The bias controller 50 also includes a terminal 50_5, resistors 50_6 and 50_7, and a transistor 50_8. A signal Vcont2 is input from the CPU 24 to the terminal 50_5, the resistors 50_6 and 50_7 are connected in series between the terminal 50_5 and the ground, and the transistor 50_8 has a base connected to the node between the resistors 50_6 and 50_7 and an emitter connected to the ground.

The bias controller 50 also includes a resistor 50_9 connected between the collectors of both the transistors 50_4 and 50_8 and a resistor 50_10 connected to the collector of the transistor 50_4.

FIG. 10 also shows the CCD 22, which has a substrate bias circuit 22_1, a transistor 22_2, and terminals 22_3 and 22_4, and the capacitor 41 and the resistor 42 described above. A power supply voltage Vcc for the CCD 22 is applied to a collector of the transistor 22_2.

The signal Vcont1 shown in FIG. 11 is input to the terminal 50_1 of the bias controller 50, and the signal Vcont2 shown in FIG. 11 is input to the terminal 50_5 thereof. At first, both the signals Vcont1 and Vcont2 are set to the "L" level. Accordingly, both the transistors 50_4 and 50_8 are turned off, thereby the voltage V of the terminal 22_3 of the CCD 22 is set to a "H" level determined by the voltage from the substrate bias circuit 22_1. Since the high level voltage V is applied to the transistor 22_2, a relatively high level substrate bias voltage Vsub is output from the transistor 22_2.

Next, the signal Vcont2 changes from the "L" level to a "H" level. Thus, the transistor 50_8 changes from the turned-off state to a turned-on state. With this operation, the voltage V is set to an intermediate level determined by the internal impedance of the substrate bias circuit 22_1 and the series resistance value of both the resistors 50_10 and 50_9.

Further, the signal Vcont1 changes from the "L" level to the "H" level in the period during which the changes from the turned-off state to a turned-on state. With this operation, the voltage V is set to a low level determined by the internal impedance of the substrate bias circuit 22_1 and the resistance value of the resistor 50_10.

On the completion of the smear period, the signal Vcont1 changes from the "H" level to the "L" level, and the transistor 50_4 changes from the turned-on state to the turned-off state. With these operations, the voltage V is set to the intermediate level described above.

Further, the signal Vcont2 also changes from the "H" level to the "L" level, and the transistor 50_8 also changes from the turned-on state to the turned-off state. With these operations, the voltage V is set to the high level described above. As described above, the OFD voltage may be changeably set by controlling the substrate bias circuit Vsub by the three levels, that is, by the high level, the intermediate level, and the low level.

Figure 12:
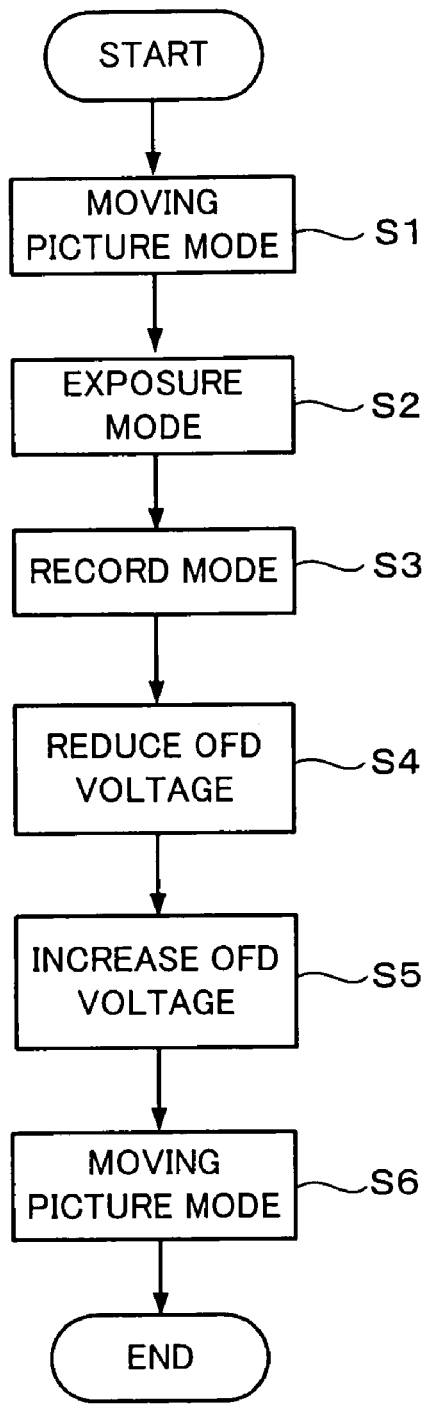
FIG. 12 is a flowchart of a processing routine for changeably setting an OFD voltage of the digital camera of the embodiment.

FIG. 12 is a flowchart of a processing routine for changeably setting the OFD voltage of the digital camera of the embodiment.

First, at step S1, the moving picture mode is executed. In the moving picture mode, processing for displaying the through image on the image monitor 19, and the like are executed. Next, at step S2, the exposure mode is executed, and the process goes to step S3.

At step S3, a record mode as the still picture capture mode is executed. Further, at step S4, processing for reducing the OFD voltage is executed. More specifically, the OFD voltage when the smear read-out is executed is set to the OFD voltage V lower than the OFD voltage in the still picture capture mode.

Next, at step S5, processing for increasing the OFD voltage is executed. More specifically, the low OFD voltage set at the time of smear read-out is returned to the OFD voltage in the still picture capture mode.

At step 6, the moving picture mode similar to that at step S1 is executed, and the routine is finished.

It should be noted that, although the embodiment is described by exemplifying the digital camera as the image pick-up apparatus of the present invention, the image pick-up apparatus of the present invention is by no means limited to the digital camera and it may be, for example, a mobile phone with a camera function which has become widespread recently.

In addition to the above, it is needless to say that the image pick-up apparatus of the present invention is not limited to pick up a still picture and is also used as an image pick-up apparatus having a moving picture pick-up function.

What is claimed is:

1. A read controller for an image pick-up device, wherein the image pick-up device has a plurality of sensors that are disposed therein and accumulate charges according to an amount of light, the accumulated charges are read out from the image pick-up device through predetermined transfer paths, and the read controller controls reading of the charges from the image pick-up device, the read controller comprising:
  an overflow drain voltage set section that changeably sets an overflow drain voltage for discharging the saturated charges of the sensors; and
  a smear read-out controlling section that clears the transfer paths by reading out charges remaining in the transfer paths,
  wherein the overflow drain voltage set section sets the overflow drain voltage to a voltage such that an amount of saturated charges equal to or greater than a predetermined amount of charges is secured even if a voltage fluctuation occurs due to smear read-out executed by the smear read-out controlling section, and
  wherein said overflow drain voltage set section sets the overflow drain voltage at a time of the smear read-out, to a voltage lower than an overflow drain voltage at a time of a still picture read-out, and when a moving picture is read out, to a voltage greater than the overflow drain voltage at the time of the still picture read-out.

2. The read controller for an image pick-up device according to claim 1, wherein a first voltage, a second voltage, and a timing pulse are applied to the smear read-out controlling section,
  wherein the smear read-out controlling section outputs a vertical synchronization pulse to the image pick-up device in response to the timing pulse, and outputs a first pulse-shaped signal waveform, which changes in a voltage range from the first voltage to the second voltage,
  wherein the signal waveform is applied through a capacitor to the image pick-up device, an input of said image pick-up device is grounded through a resistor, and
  wherein a substrate bias voltage is applied to the image pick-up device through a diode.

3. The read controller for an image pick-up device according to claim 2, wherein a second pulse-shaped signal waveform, which is obtained by superimposing the substrate bias voltage on the first pulse-shaped signal waveform, is output to a node,
  wherein a smear read-out is executed in a period of the second pulse-shaped signal waveform, and
  wherein the substrate bias voltage is controlled in said period.

4. The read controller for an image pick-up device according to claim 1, wherein the overflow drain voltage set section comprises a bias controller, said bias controller comprising:
  a first terminal;
  a first set of resistors; and
  a first transistor,
  wherein the first set of resistors are connected in series between the first terminal and ground, and
  wherein the first set of transistor comprises a base connected to a first node between the first resistors and a first emitter connected to the ground.

5. The read controller for an image pick-up device according to claim 4, wherein said bias controller further comprises:
  a second terminal;
  a second set of resistors;
  a second transistor,
    wherein the second set of resistors are connected in series between the second terminal and the ground, and
    wherein the second transistor comprises a base connected to a second node between the second set of resistors and a second emitter connected to the ground; and
  a resistor connected between collectors of the first transistor, the second transistor, and
  a resistor connected to the collector of the first transistor.

6. An image pick-up apparatus that captures object light and creates an image signal comprising:
  an image pick-up device that has a plurality of sensors that are disposed therein and accumulate charges according to an amount of light, the accumulated charges being read out through predetermined transfer paths;
  an overflow drain voltage set section that changeably sets an overflow drain voltage for discharging the saturated charges of the sensors; and
  a smear read-out controlling section that clears the transfer paths by reading out charges remaining in the transfer paths,
  wherein the overflow drain voltage set section sets the overflow drain voltage to a voltage such that an amount of saturated charges equal to or greater than a predetermined amount of charges is secured even if a voltage fluctuation occurs due to smear read-out executed by the smear read-out controlling section, and
  wherein said overflow drain voltage set section sets the overflow drain voltage at a time of the smear read-out, to a voltage lower than an overflow drain voltage at a time of a still picture read-out, and when a moving picture is read out, to a voltage greater than the overflow drain voltage at the time of the still picture read-out.

7. An image pick-up apparatus according to claim 6, wherein the image pick-up apparatus picks up a still picture using the image pick-up device during the still picture pick-up mode, and the overflow drain voltage set section sets an overflow drain voltage when smear is read by the smear read-out controlling section to an overflow drain voltage lower than an overflow drain voltage when the still picture is read out.

8. An image pick-up apparatus, comprising:
  a plurality of sensors that accumulate charges according to an amount of light; and
  an overflow drain voltage set section that changeably sets an overflow drain voltage for discharging a plurality saturated charges from the plurality of sensors,
  wherein the overflow drain voltage set section sets the overflow drain voltage to a voltage lower than an overflow drain voltage in a still picture capture mode, and
  wherein said overflow drain voltage set section sets the overflow drain voltage at a time of a smear read-out, to a voltage lower than an overflow drain voltage at a time of a still picture read-out, and when a moving picture is read out, to a voltage greater than the overflow drain voltage at the time of the still picture read-out.

9. The image pick-up apparatus according to claim 8, wherein the overflow drain voltage set section sets the overflow drain voltage to a voltage that maintains an amount of saturated charges at a predetermined amount before a smear read-out is executed by a smear read-out controlling section, even if a voltage fluctuation occurs.

10. The image pick-up apparatus according to claim 9, wherein the voltage fluctuation occurs due to the smear read-out executed by the smear read-out controlling section.

11. The image pick-up apparatus according to claim 8, further comprising:
  a smear read-out controlling section that clears a plurality of transfer paths by reading out a plurality of charges remaining in the plurality of transfer paths,
  wherein the overflow drain voltage set section sets the overflow drain voltage to the voltage lower than the overflow drain voltage in the still picture capture mode when a smear is read by the smear read-out controlling section.

12. The image pick-up apparatus according to claim 8, wherein the overflow drain voltage set section comprises a bias controller, and wherein a substrate bias voltage is applied to the sensors from the bias controller through a diode.

13. An image pick-up apparatus, comprising:

an image pick-up means for accumulating charges according to an amount of light; and an overflow drain voltage set means for discharging a plurality of charges from the image pick-up means, wherein the overflow drain voltage set means sets an overflow drain voltage at a time of a smear read-out, to a voltage lower than an overflow drain voltage at a time of a still picture read-out, and when a moving picture is read out, to a voltage greater than the overflow drain voltage at the time of the still picture read-out.

14. The image pick-up apparatus according to claim 13, wherein the overflow drain voltage set means sets a overflow drain voltage to a voltage that maintains an amount of saturated charges at a predetermined amount before a smear read-out is executed by a smear read-out controlling means, even if a voltage fluctuation occurs due to the smear read-out.

15. The image pick-up apparatus according to claim 13, wherein the overflow drain voltage set means sets the overflow drain voltage when a smear is read by a smear read-out controlling means to be lower than an overflow drain voltage when a still picture is read out.

16. The image pick-up apparatus according to claim 13, wherein the overflow drain voltage set means sets an overflow drain voltage to a voltage such that an amount of saturated charges equal to or greater than a predetermined amount is secured.

17. The image pick-up apparatus according to claim 13, wherein the overflow drain voltage set means sets an overflow drain voltage such that an amount of saturated charges equal to or larger than a predetermined amount is secured even if a voltage fluctuation occurs.

18. The image pick-up apparatus according to claim 17, wherein the voltage fluctuation occurs due to a smear read-out executed by a smear read-out controlling section.

19. The image pick-up apparatus according to claim 13, further comprising:

a smear read-out controlling means for clearing a plurality of transfer paths by reading out a plurality of charges remaining in the plurality of transfer paths, wherein the overflow drain voltage set means sets an overflow drain voltage when smear is read by the smear read-out controlling means.

20. The image pick-up apparatus according to claim 19, wherein the image pick-up apparatus has a still picture pick-up mode, and the overflow drain voltage set means sets the overflow drain voltage when smear is read to be lower than an overflow drain voltage when the still picture is read out.

* * * * *